United States Patent [19]

Taylor-Myers

[11] 4,078,622

[45] Mar. 14, 1978

[54] ROAD SURFACE RECESSING DEVICE

[76] Inventor: Robert W. Taylor-Myers, 1112 Cory Ave., Los Angeles, Calif. 90069

[21] Appl. No.: 712,026

[22] Filed: Aug. 5, 1976

[51] Int. Cl.[2] .......................... E21B 9/16; B23B 51/08

[52] U.S. Cl. ...................................... 175/404; 125/20; 175/386; 299/55; 408/59; 408/118; 408/224

[58] Field of Search ............................ 125/20; 299/55; 408/204, 205, 206, 186, 118, 59, 223, 224, 225, 227, 713, 234, 189, 190; 175/404, 386; 29/103 R, 103 A, 105 A

[56] References Cited

U.S. PATENT DOCUMENTS

| | | | |
|---|---|---|---|
| 1,612,338 | 12/1926 | Wilson et al. | 175/404 X |
| 2,854,219 | 9/1958 | MacNeil | 175/404 |
| 2,864,600 | 12/1958 | Kirkpatrick | 175/404 X |
| 3,360,025 | 12/1967 | Gallo, Sr. | 144/224 X |
| 3,540,323 | 11/1970 | Rishel | 408/186 |
| 3,609,056 | 9/1971 | Hougen | 408/204 X |

FOREIGN PATENT DOCUMENTS

| | | | |
|---|---|---|---|
| 421,409 | 5/1947 | Italy | 125/20 |
| 937,940 | 9/1963 | United Kingdom | 125/20 |

*Primary Examiner*—Othell M. Simpson

*Assistant Examiner*—W. D. Gray

*Attorney, Agent, or Firm*—Huebner & Worrel

[57] ABSTRACT

A device is provided for creating recesses for road surface markers in road surfaces which makes initially a cut sufficient to stabilize the device in the desired position and then fragments and discharges core material within a circular cut defining the recess. Such fragmentation is effected by rotation of a plurality of radially disposed cutting edges each spanning only a portion of the radius of the material to be fragmented.

8 Claims, 9 Drawing Figures

ROAD SURFACE RECESSING DEVICE

BACKGROUND OF THE INVENTION

1. Field of the Invention

The present invention relates to apparatus of the character employing rotating axially movable cutting tools for recessing surfaces, and more particularly to a device of that kind for creating recesses in road surfaces in which road surface markers commonly are mounted.

2. Description of the Prior Art

As shown in my U.S. Pat. No. 3,373,667 granted Mar. 19, 1968, road surface markers such as, for example, those described therein, commonly are mounted in recesses, or seats, which either are cast in situ in newly laid pavement or cut into existing pavement surfaces.

The cutting of such recesses into existing pavement surfaces has been accomplished by a two step process consisting of first employing a cylindrical coring cutter to cut part of the way through the road surface, which usually is of concrete, and then employing a chipping tool to remove the core thus defined, piece by piece.

Since this is both time consuming and labor intensive, a need has existed since the advent of road surface markers of the above type for a device capable of rapidly creating accurately located marker recesses in a single operation.

SUMMARY OF THE INVENTION

The road surface recessing device of the present invention meets this need by combining with a suitably modified cylindrical coring cutter presenting a circular cutting edge, a core fragmenting device contained within the cylindrical coring cutter which functions, after an initial circular cut has stabilized the device in the desired position, to fragment the core defined by the coring cutter; the detritus thus formed being discharged by flowing a liquid coolant, such as water, outwardly through discharge ports in the wall of the cylindrical coring cutter. The core fragmentation is accomplished by a plurality of cutting edges each moving along a different circular path within the cylindrical coring cutter, and a cutting face on a central shaft supporting such cutting edges as well as contributing to the initial stabilization of the device in a desired position.

DESCRIPTION OF THE PREFERRED EMBODIMENT

Figure 1:
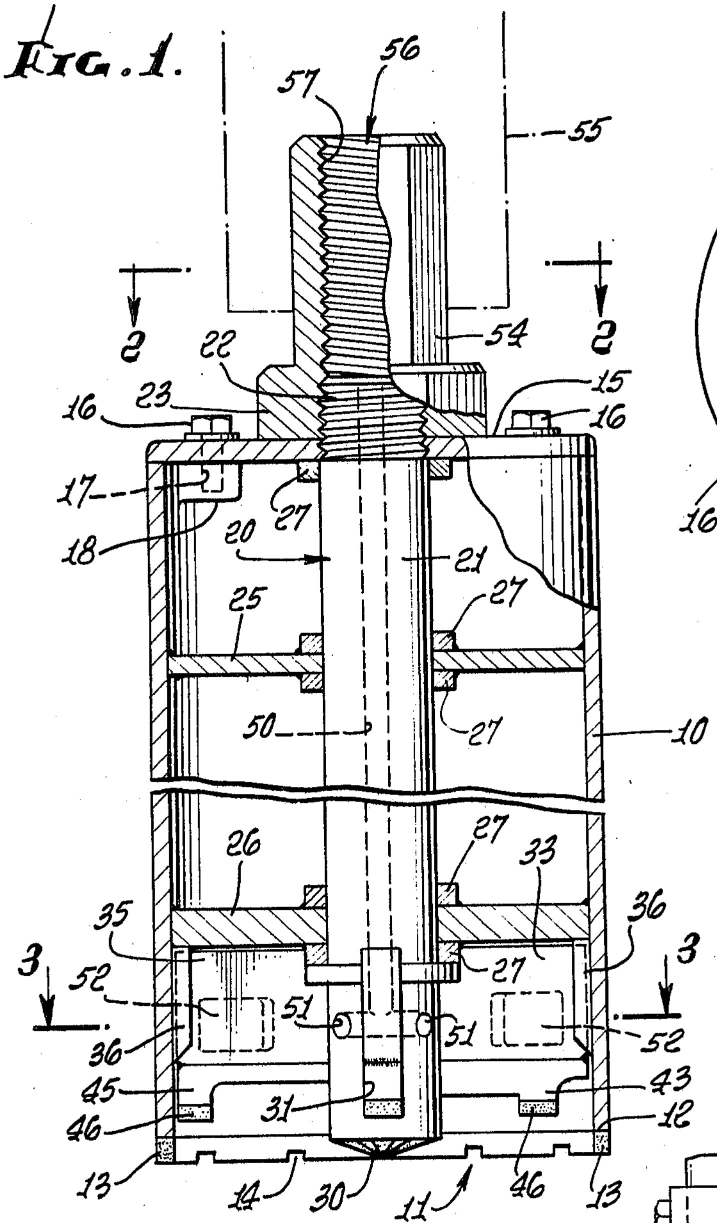
FIG. 1 is a view, partially in section, of a recessing device embodying the present invention; the section being taken on the line 1—1 of FIG. 3.

The recessing device of the present invention includes a core fragmenting device which is incorporated into the body portion of a conventional coring tool consisting essentially of a hollow cylindrical body portion 10 (FIG. 1) having an open end 11 at which there is presented a circular edge 12 faced with a hard abrasive material 13 such as tungsten carbide steel or a diamond abrasive to provide a cutting edge which is relieved at intervals, as at 14, to facilitate escape of detritus and coolant, and having a closed end cap 15. The cap 15 is secured to the body portion 10 by means of nuts 16 which are threaded into tapped bores 17 formed in gussets 18 located around the interior of the body portion 10.

Coring tools embodying such elements are well known and are in general use for cutting into materials such as concrete, in which applications they are rotated by any desired means while the edge 12 is in contact with the material to be cored and while a coolant, usually water, is fed into the interior of the body portion 10. When it is desired to create a recess in such material without cutting completely through it, however, the core material heretofore has had to be removed by means of a separate chipping tool in a separate operation. The present invention provides means whereby such a recess can be created at the same time the coring cut is being made; the core being simultaneously fragmented and removed.

Figure 4:
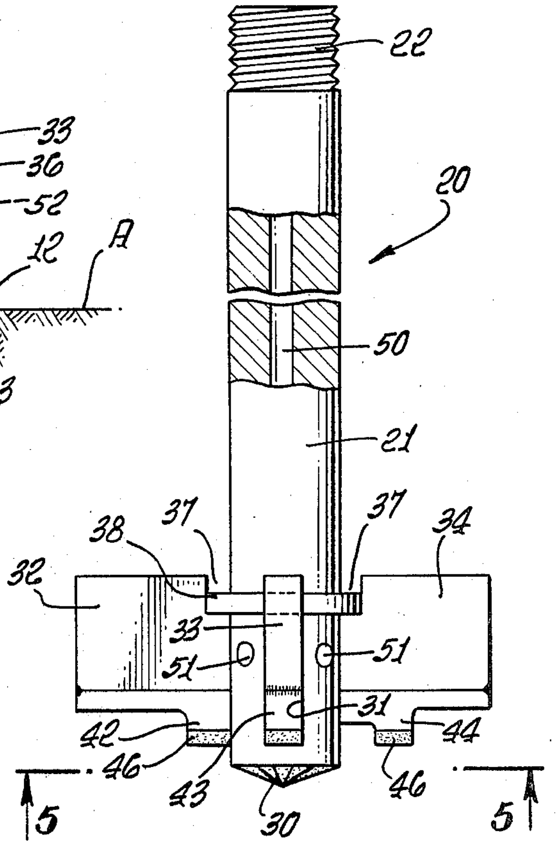
FIG. 4 is a detail view, partially in section, of the core fragmenting portion of the device.

For this purpose a core fragmenting device 20 (FIG. 4) is provided for incorporation into a suitably modified coring tool of the kind described above; the modifications being described in detail hereinafter.

Figure 2:
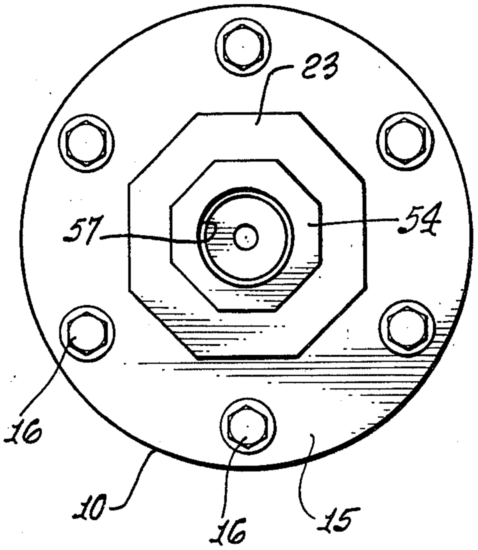
FIG. 2 is a plan view of the device of FIG. 1.

The core fragmenting device 20 comprises a tubular member 21 which passes through a central aperture in the closed end 15 of the body portion 10 (FIG. 1) and is threaded at one end, as at 22, for engagement with the threads of an internally threaded octagonal nut 23 (FIGS. 1 and 2) which serves to retain the member 21 in axial alignment within the body portion 10. Deflection of member 21 during operation is prevented by discs 25 and 26 which are welded to the interior wall of body portion 10 and through apertures in which the member 21 passes. Additional reinforcement may be provided adjacent the apertures through which the member 21 passes such as, for example, perforate discs 27 welded to the upper and lower faces of the discs 25 and 26 and the closed end 15 of the body portion 10.

The opposite, free end of member 21 is disposed in substantially the same plane as the edge 12 of the body portion 10, is conical in shape, and is faced with an abrasive material such as tungsten carbide steel or a diamond abrasive to provide a cutting end, and perferably includes a bit end construction, all as indicated at 30.

Figure 5:
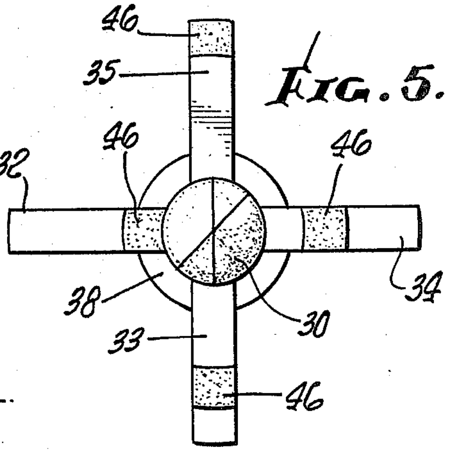
FIG. 5 is an end view of the device of FIG. 4 taken from the line 5—5 of FIG. 4.

Inwardly of that end, member 21 is provided with four opposite rectangular recesses 31 adapted to receive the inner ends of bars 32, 33, 34 and 35 (FIG. 5) the outer ends of which are received in channels defined by ribs 36 welded to the interior wall of body portion 10. Each of the bars 32, 33, 34 and 35 has an angular cut-out portion 37 (FIG. 4) at its inner end in which a perforate disc 38 surrounding member 21 is received. The inner end of each of the bars 32, 33, 34 and 35 is securely welded to the member 21 and is thus held in torque transmitting engagement with the body portion 10 and member 21.

Each of the bars 32, 33, 34 and 35 has a downwardly extending portion 42, 43, 44 and 45, respectively, faced with an abrasive material such as tungsten carbide steel or a diamond abrasive as at 46 to provide a cutting face. Each of the abrasive faced portions 42, 43, 44 and 45, however, is located at a different radial distance from the center of the member 21 and their relative radial dimensions are such that together they substantially completely span the radial distance between member 21 and the interior wall of body portion 10.

Figure 6:
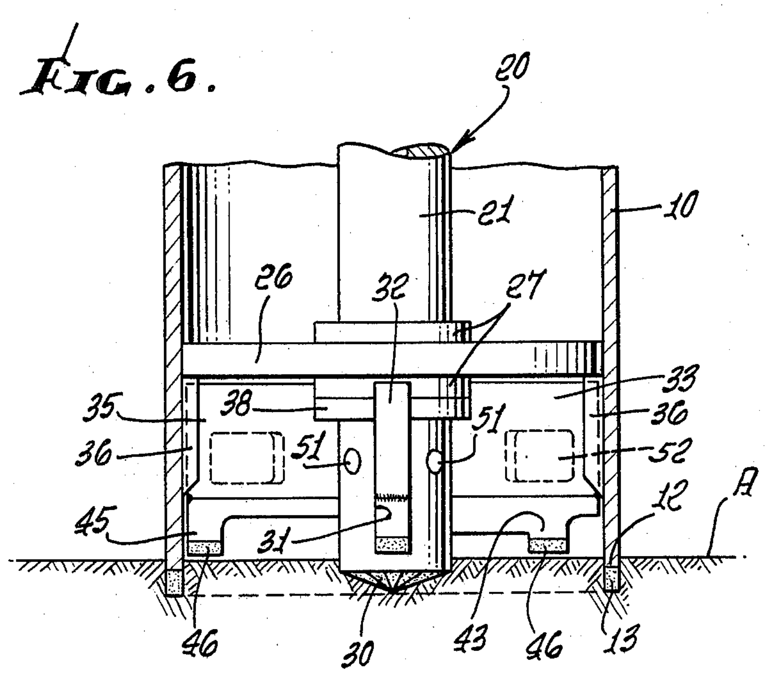
FIG. 6 is a detail view illustrating the employment of the device to create an initial stabilizing cut in a concrete surface.

It is important that the cutting faces 46 be disposed at a sufficient distance inwardly from the open end of body portion 10 so that, as shown in FIG. 6, the abrasive facing 13 of the edge 12, and preferably also, or alternatively, the abrasive facing 30 on tubular member 21, will have penetrated the surface A sufficiently to stabilize the device in the desired position before the cutting faces 46 engage the surface A.

Figure 9:
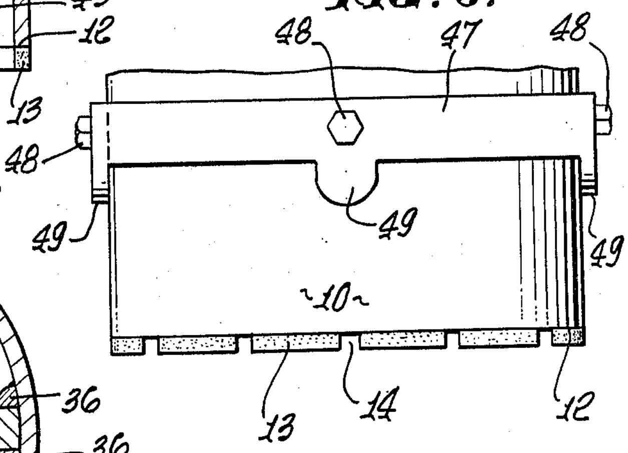
FIG. 9 is a detail view illustrating means for limiting penetration into a surface to be recessed.

Preferably means are provided, as shown in FIG. 9, for limiting the depth of penetration of the device into the surface to be recessed. This means comprises a demountable ring 47 which may be attached to the exterior of the body portion 10 by means such as bolts 48 spaced at intervals around the body portion 10 and threaded into it. The ring 47 is provided with depending stop lugs 49 positioned to engage the uncut edge of a surface being recessed when the recessing has reached the desired depth. It is contemplated that rings having stop lugs of different lengths may be attached to the body portion 10 in accordance with whatever depth of recess is to be made.

Figure 3:
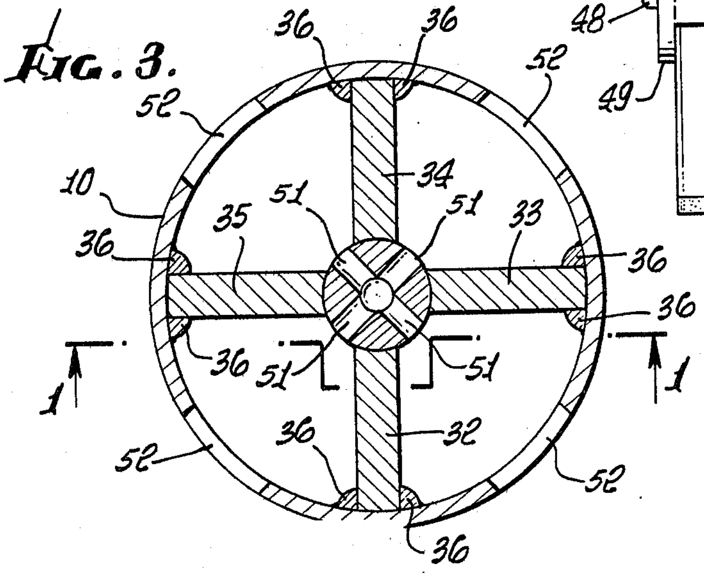
FIG. 3 is a view in section of the device of FIG. 1; the section being taken on the line 3—3 of FIG. 1.
Figure 7:
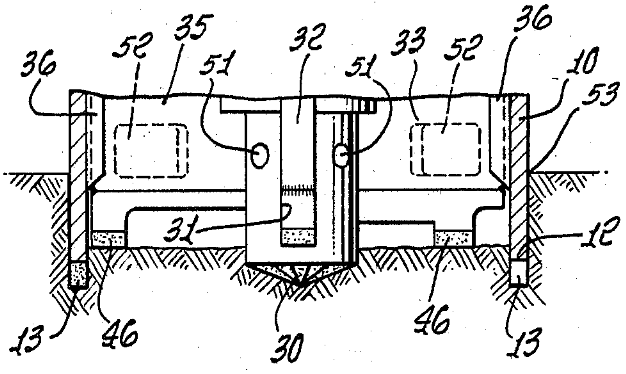
FIG. 7 is a detail view illustrating the employment of the device to form a recess in a concrete surface.

Centrally of the member 21 (FIGS 1 and 4) there is provided means for conducting a coolant comprising an axially extending fluid conduit 50 which connects at its lower end with each of four ports 51 (see also FIG. 3) constituting means for discharging a coolant such as water into the lower end portion of the body portion 10 adjacent the cutting faces 13, 30 and 46. Because of the quantity of detritus produced by the cutting faces 21 and 46, discharge ports 52 are provided in body portion 10 extending above the upper edge 53 of the recess designed to be cut, as shown in FIG. 7.

Integral with the nut 23 (FIGS. 1 and 2) is an octagonal hub 54 adapted to be received in a chuck 55 connected to a source of power for rotating the body portion 10 and its associated parts. The hub 54 is provided with a central passage 56 communicating with the fluid conduit 50 and preferably is internally threaded as at 57 for connection to a source of coolant.

The device is employed to create a recess in a concrete surface such as a roadway, for example, by applying power to rotate the hub 54 and making an initial cut by pressing the edge 12 and conical end 30 of member 21 against the surface in which the recess is to be formed, while supplying a coolant such as water through the central passage 56 of hub 54; the initial cut thus created being illustrated in FIG. 6.

Figure 8:
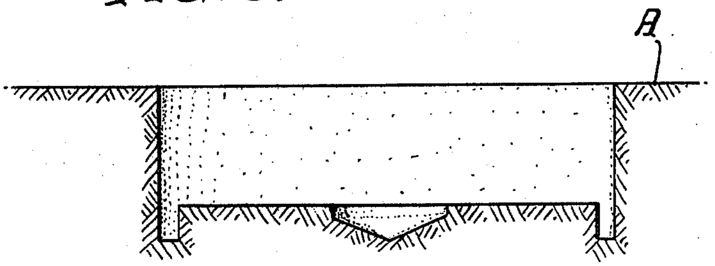
FIG. 8 is a view in section of a recess created in a concrete surface by the use of the device.

When this initial cut has been made, the body portion 10 is stabilized in the desired position by the entry of edge 12 and conical end 30 into their respective cuts. The abrasive facings 46 of the downwardly extending portions 42, 43, 44 and 45 of bars 32, 33, 34 and 35 then engage and fragment the respective portions of the concrete surface underlying them into chips small enough to readily pass through the discharge ports 52 without displacing the body portion 10 from its stabilized position, and the creation of the desired recess proceeds as illustrated in FIG. 7 until a recess of the kind illustrated in FIG. 8 has been created. It will be noted that the discharge ports 52 are positioned and dimensioned so that at all times during such an operation, the coolant being supplied will carry the detritus created by the core fragmentation out upon the surrounding concrete surface.

I claim:

1. In a surface shallow recessing device including coring means comprising a cylindrical open-ended body portion presenting a substantially continous cylindrical cutting edge, said cutting edge being interrupted at circumferentially spaced short intervals, said intervals being relatively short with respect to the substantially continuous cutting edge, said short intervals providing escape spaces for detritus and a coolant along the substantially continuous cutting edge, the improvement comprising:

core fragmenting means including a plurality of radially extending spaced bars secured within said cylindrical body portion and a cutting edge portion on each of said bars adjacent but spaced inwardly of the open end of said body portion a sufficient distance so that said cutting edge portions are capable of engaging a core to fragment the same only after said substantially continuous cutting edge has cut into a surface sufficiently to stabilize the device in the desired position in a cylindrical recess cut into the surface, each of said cutting edge portions being located at a different radial position, said portions together spanning substantially the entire distance over which the bars extend to make a relatively smooth surfaced recess inwardly of said cylindrical recess where the core is fragmented.

2. A surface recessing device according to claim 1 including demountable means for limiting penetration of the device into a surface to be recessed.

3. A surface recessing device according to claim 1 in which a tubular member is axially and removably disposed within said cylindrical body portion and said radially extending bars are secured thereto.

4. A surface recessing device according to claim 3 in which said tubular member includes means for conducting a coolant and discharging the same adjacent said cutting edge portions.

5. A surface recessing device according to claim 4 in which said tubular member has a cutting end disposed in substantially the same plane as said cutting edge.

6. The invention according to claim 1 in which:

said cutting edge portions are in substantially the same plane, said plane being transverse to the axis of the cylindrical open-ended body portion.

7. The invention according to claim 6 in which:

said plane is substantially parallel to the substantially continuous cutting edge.

8. The invention according to claim 11 in which:

said short intervals being of rectangular channel shape open in the direction of the substantially continuous cutting edge.

* * * * *